(12) United States Patent
Kliskey

(10) Patent No.: US 8,327,516 B2
(45) Date of Patent: Dec. 11, 2012

(54) VALVE PUNCH TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 457 days.

(21) Appl. No.: 12/725,896

(22) Filed: Mar. 17, 2010

(65) Prior Publication Data
US 2011/0225785 A1 Sep. 22, 2011

(51) Int. Cl.
*B25B 25/18* (2006.01)
*B60C 27/24* (2006.01)

(52) U.S. Cl. .............. 29/275; 29/253; 29/270; 29/278

(58) Field of Classification Search .............. 29/235, 29/255, 238–239, 270, 278, 244, 253
See application file for complete search history.

(56) References Cited

U.S. PATENT DOCUMENTS

| | | |
|---|---|---|
| 103,330 A | 5/1870 | Heusser |
| 344,653 A | 6/1886 | Harmon |
| 840,580 A | 1/1907 | McMillan |
| 1,403,919 A | 1/1922 | Seppmann |
| 1,518,068 A | 12/1924 | Horn |
| 1,597,159 A | 8/1926 | Johnson et al. |
| 1,662,538 A | 3/1928 | Richmond et al. |
| 1,958,329 A | 5/1934 | Beard |
| 2,380,068 A | 7/1945 | Patton |
| 2,466,845 A | 4/1949 | Ghee et al. |
| 2,475,041 A | 7/1949 | Mattson |
| 2,490,684 A | 12/1949 | Gosselin |
| 2,754,585 A | 7/1956 | Green |
| 2,779,089 A | 1/1957 | Allen |
| 2,934,984 A | 5/1960 | Woodman |
| 3,036,482 A | 5/1962 | Kenworthy et al. |
| 3,113,478 A | 12/1963 | Hall, Jr. et al. |
| 3,219,316 A | 11/1965 | Fried |
| 3,336,652 A | 8/1967 | Ullmo |
| 3,381,763 A | 5/1968 | Matson |
| 3,568,657 A | 3/1971 | Gue |
| 3,570,289 A | 3/1971 | Smyers |
| 3,710,407 A | 1/1973 | Reid |
| 3,712,389 A | 1/1973 | Smoak |
| 3,739,452 A | 6/1973 | Gadberry |
| 4,003,119 A | 1/1977 | Hugh |
| 4,068,365 A | 1/1978 | Brandt et al. |

(Continued)

OTHER PUBLICATIONS

SlideSledge Frame Hammer product brochure (4 color pages). Slide Sledge, LLC; 2500 W. Higgins Road, Suite 1050, Hoffman Estates, IL 60195; Phone 1-800-276-0311; Fax 1-877-477-3356; www.slidesledge.com; brochure bears marking "Copyright (c) 2004, Slide Sledge, LLC" on fourth page.

*Primary Examiner* — Lee D Wilson
(74) *Attorney, Agent, or Firm* — REnner Kenner Greive Bobak Taylor, Weber

(57) ABSTRACT

A punch tool includes a housing, a ram bar, and a floating punch assembly. The housing includes a cap having a lip defining an opening, and elongated slots. The floating punch assembly includes a floating punch having a first portion, a second portion, and a third portion with ledges formed at the intersection of the three portions. One ledge is larger than the opening in the cap. The floating punch also includes a bore, and a retaining pin extends through the slots in the housing and the bore.

9 Claims, 4 Drawing Sheets

U.S. PATENT DOCUMENTS

| | | |
|---|---|---|
| 4,241,795 A | 12/1980 | Landry, Jr. |
| 4,280,540 A | 7/1981 | Meacham |
| 4,294,298 A | 10/1981 | Otte, Jr. |
| D262,513 S | 1/1982 | Allen |
| 4,335,493 A | 6/1982 | Shivers, Jr. et al. |
| 4,362,194 A | 12/1982 | Lawson |
| 4,376,385 A | 3/1983 | Davis |
| D272,712 S | 2/1984 | Allen |
| 4,470,440 A | 9/1984 | Thor |
| 4,675,968 A | 6/1987 | Bartlett |
| 4,802,256 A | 2/1989 | Usimaki |
| 5,070,564 A | 12/1991 | Fey |
| 5,085,281 A | 2/1992 | Selly |
| 5,088,174 A | 2/1992 | Hull et al. |
| 5,109,739 A | 5/1992 | Hull et al. |
| 5,245,737 A | 9/1993 | Perea |
| 5,251,368 A | 10/1993 | Somerville et al. |
| 5,370,192 A | 12/1994 | Evinger |
| 5,495,878 A | 3/1996 | McKenen, Jr. |
| 5,699,864 A | 12/1997 | Dvorak et al. |
| 5,727,302 A * | 3/1998 | Sawdon ............ 29/436 |
| 5,878,822 A | 3/1999 | Roy |
| 6,109,365 A | 8/2000 | Lamoureux et al. |
| 6,125,519 A * | 10/2000 | Kaibach et al. ............ 29/275 |
| 6,125,719 A | 10/2000 | Lowther et al. |
| 6,349,618 B1 | 2/2002 | Lowther |
| 6,427,304 B2 * | 8/2002 | Kaibach et al. ............ 29/263 |
| 6,474,198 B2 | 11/2002 | Lowther |
| 7,111,533 B1 * | 9/2006 | Ran ................ 81/490 |
| 7,509,721 B1 * | 3/2009 | Liang ............ 29/243.53 |
| 2011/0225785 A1 * | 9/2011 | Kliskey ............ 29/275 |

\* cited by examiner

VALVE PUNCH TOOL

TECHNICAL FIELD

This invention relates to a punch tool. More particularly, this invention relates to a punch tool that is useful for removing valve stem assemblies from wheels. Even more particularly, this invention relates to a punch tool used to break a valve stem assembly off of a wheel.

BACKGROUND OF THE INVENTION

Valve stem assemblies are commonly associated with wheels for heavy duty vehicles such as semi tractor/trailer and off-highway trucks and the like that have tubeless tire wheels. Without a tire installed on the wheel, a valve stem assembly is installed on a wheel so that one end is secured to the inner surface of the wheel, and the other end is accessible for connection with a source of pressurized air.

Valve stem assemblies are installed according to methods well known in the art. Typically, this involves inserting part of a valve stem assembly into a hole in the wheel and then threading a nut onto a threaded portion of the valve stem assembly on the outer surface of the wheel. Then, a tire may be installed onto the wheel and inflated by connecting the valve stem assembly to a source of pressurized air, as is well known in the art.

After a period of time, a valve stem assembly may become damaged and require repair or replacement. This is notoriously difficult, especially if the nut and threaded portion of the valve stem assembly have rusted or otherwise grown together. Removing such nuts from such threads using a wrench can be difficult, and becomes even more difficult if the edges on the nut become rounded off. Given the low cost of valve stem assemblies, practitioners have realized that is it often easier or more economical to simply break an old valve stem assembly off of a wheel.

To do so, practitioners have been know to use a variety of striking devices, but have found slide-hammer type devices particularly useful for removing valve stem assemblies. Slide-hammers are generally well known, and come in a variety of assortments depending on the relevant application. Slide-hammers generally include two portions that are concentrically arranged. One portion is held stationary against an object to be struck and the other portion is moved away from the stationary portion and brought back into contact with the stationary portion, thereby transferring the momentum of the moving portion to the stationary portion, and then to the object to be struck. Modifications on this basic idea have included specialized tips for contacting the item to be struck, with the tips having different shapes such as curved tips, punch tips, chisel tips, rounded tips, forked tips and the like. Slide-hammers have proven to be especially useful for working on wheels as they provide a lengthwise extension between the wheel, which is typically situated on the ground, and the practitioner, who is standing.

Another known modification to the basic slide-hammer design is where the contacting tip is not fixedly connected to the stationary portion, such tips being known in the art as floating tips. However, slide-hammers with floating tips often incorporate springs and other components and are assembled in a way that makes repair or disassembly extremely difficult. In one known tool, a floating tip assembly is threaded into the end of a slide-hammer, and the floating tip assembly comprises a floating tip and at least one spring held under compression. If the floating tip assembly is disassembled, it is very difficult to get its spring back under the appropriate compression and the floating tip assembly reassembled. Such a design is undesirable in at least two ways. First, it is not easy to manufacture or to remove or disassemble, thereby frustrating repair or replacement of the assembly's component pieces. Second, the arrangement of the floating tip assembly with the floating tip under a strong force from the spring substantially dampens the force transmitted to the object to be struck.

Thus, a need exists in the art for a punch tool that is easy to manufacture, easy to maintain, easy to operate and is effective in removing valve stem assemblies from wheels.

BRIEF SUMMARY OF THE INVENTION

In light of the foregoing, one or more embodiments of the invention may provide one or more of the following aspects. It is a first aspect of the present invention to provide a punch tool, and more particularly, a valve punch tool.

It is another aspect of the present invention to provide a punch tool comprising a tubular housing having an opening at one end and a cap having a lip that defines the opening, a ram bar slidably received within the housing, and a floating punch having a first portion, a second portion, and a third portion. A first ledge is formed at the intersection of the first portion and the second portion, and a second ledge is formed at the intersection of the second portion and the third portion. The first portion extends through the opening, and the second portion is situated within the housing and is larger than the opening.

Yet another aspect of the present invention is a valve punch tool for removing a valve stem assembly from a wheel, the valve punch tool comprising a tubular housing having a cap at one end, the cap defining an opening having a first diameter; and a floating punch having a tip, a first portion, a second portion, and a third portion. A first ledge is formed at the intersection of the first portion and the second portion and a second ledge is formed at the intersection of the second portion and the third portion. The first portion extends through the opening, and the second portion is situated within the housing and is larger than the opening. The tip contacts the valve stem assembly.

Yet another aspect of the present invention is a method of removing a valve stem assembly from a wheel comprising the steps of providing a valve punch tool having a tubular housing having a cap at one end, the cap defining an opening having a first diameter, a ram bar slidably received within the housing, and a floating punch having a tip, a first portion, a second portion, and a third portion, a first ledge being formed at the intersection of the first portion and the second portion and a second ledge being formed at the intersection of the second portion and the third portion, wherein the first portion extends through the opening, and the second portion is situated within the housing and is larger than the opening; positioning the floating punch on a valve stem assembly; and moving the ram bar and bringing it into contact with the floating punch, wherein the floating punch breaks the valve stem assembly.

BRIEF DESCRIPTION OF THE DRAWINGS

One or more features and advantages of the present invention will become better understood with regard to the following description, appended claims, and accompanying drawings wherein:

BEST MODE FOR CARRYING OUT THE INVENTION

Figure 1:
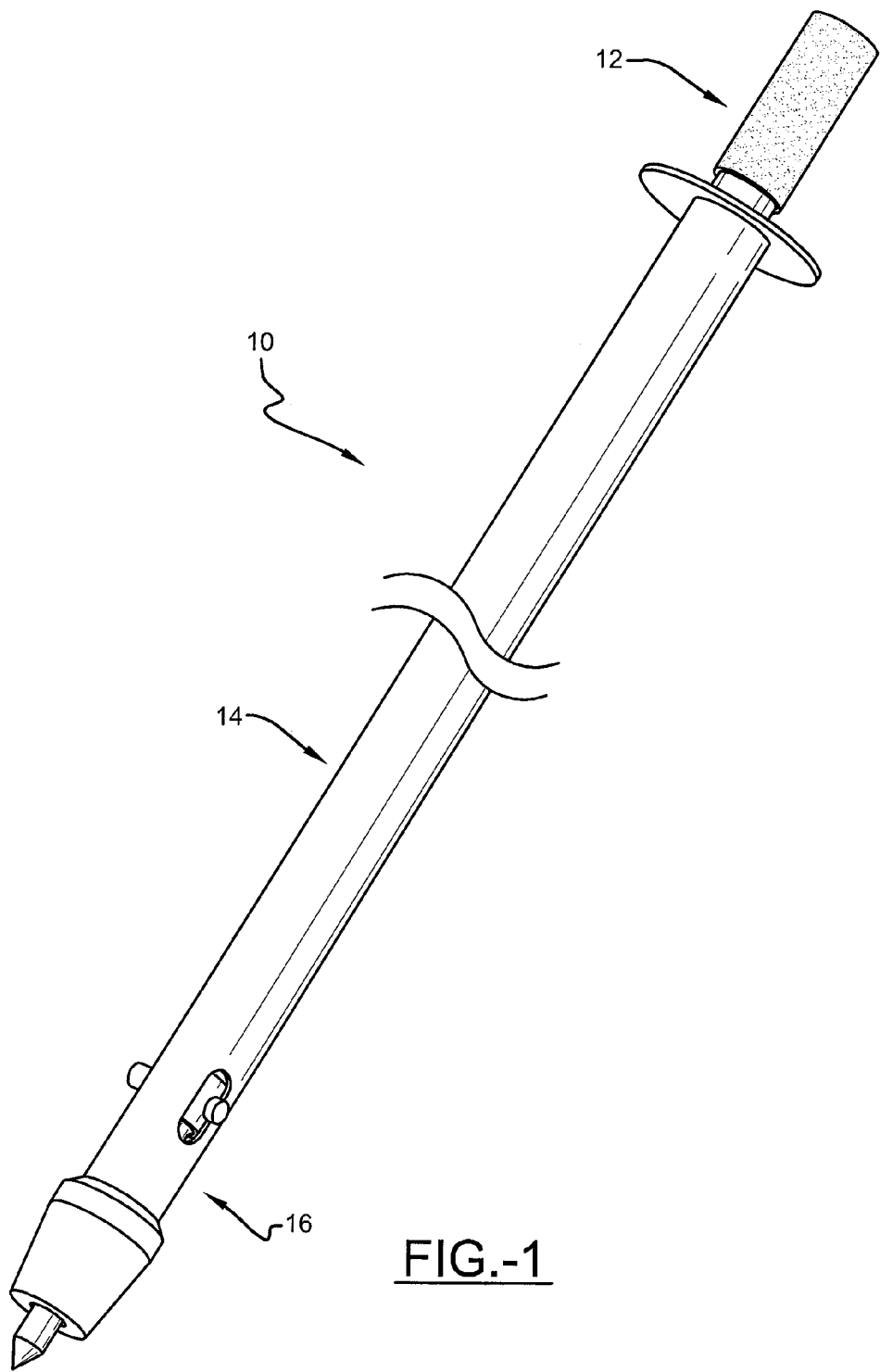
FIG. 1 is a perspective view of a valve punch tool constructed according to the concepts of the present invention.

Referring now to the figures, a valve punch tool is shown and is indicated generally by the numeral 10, and includes a ram bar 12, a housing 14 and a floating punch assembly 16.

Because the present invention is a modification on the basic idea of a slide-hammer, it can be used for any useful purpose. In the present disclosure, it is described as a valve punch tool, and methods of using it to remove valve stem assemblies are disclosed. However, one of skill in the tool arts will appreciate other useful purposes for which the invention can be used, notwithstanding it being referred to as a valve punch tool. In general, a slide hammer is used to strike an item to be struck. In the context of removing a valve stem assembly, the item to be struck is the valve stem assembly, so the description of the valve punch tool 10 will be presented accordingly. Of course, the present invention can be used to strike other items, but the discussion relating to valve stem assemblies relates to the description of the invention as a valve punch tool.

Figure 2:
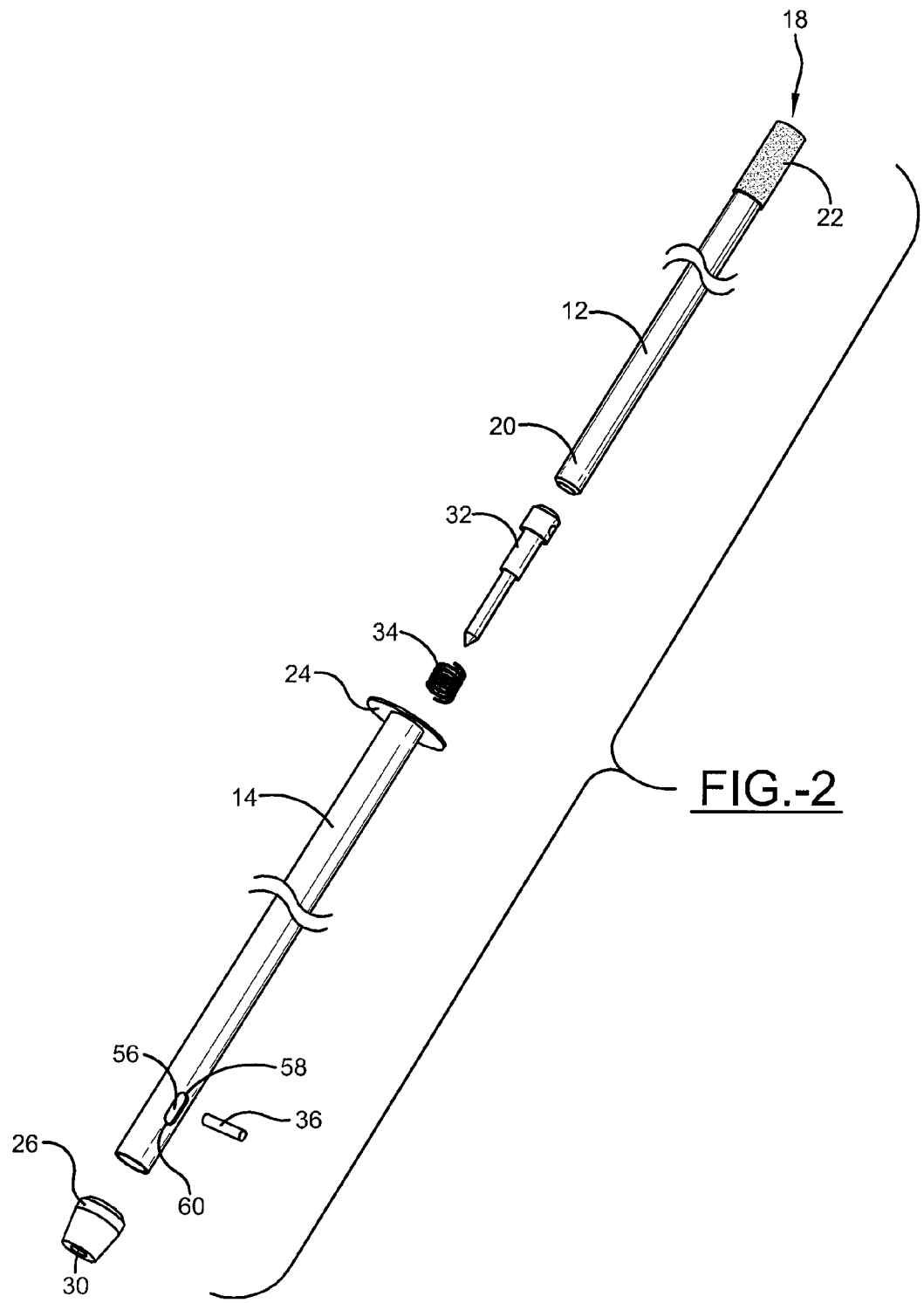
FIG. 2 is an assembly drawing showing the components of the valve punch tool of FIG. 1.

With reference to FIG. 2, ram bar 12 has a gripping end 18 and a striking end 20. Ram bar 12 is typically solid in construction, and its weight may be chosen according to the desired application. Ram bar 12 may optionally include a gripping handle 22 at the gripping end 18 to facilitate gripping and moving ram bar 12.

Housing 14 is generally tubular in structure and has an inner diameter slightly larger than the outer diameter of ram bar 12 so that ram bar 12 is free to move within the generally lengthwise direction of housing 14. Housing 14 extends along a length and has a flange 24 near one end and a cap 26 at the other end. Flange 24 is not necessarily crucial to the present invention, but provides protection for a user's hands while using valve punch tool 10.

Cap 26 includes a flange 25 that defines a mouth 27 for receiving housing 14. Cap 26 includes a radially-inwardly extending lip 28 that defines an opening 30. The lengthwise extent of opening 30 may be any length, but longer lengths are chosen to encourage proper alignment of the floating punch assembly 16 within the valve punch tool 10. That is, a longer lengthwise extent of opening 30 typically provides better alignment than a shorter lengthwise extent. Cap 26 may include beveled edges, such as at 29. Opening 30 is connected to mouth 27. The diameter of opening 30 is smaller than the inner diameter of housing 14, and mouth 27 has a diameter slightly larger than the outer diameter of housing 14.

Floating punch assembly 16 includes a floating punch 32, a spring 34, and a retaining pin 36. As will be appreciated in view of the following description, a portion of floating punch 32 extends through opening 30 of cap 26 in an assembled valve punch tool 10.

Figure 3:
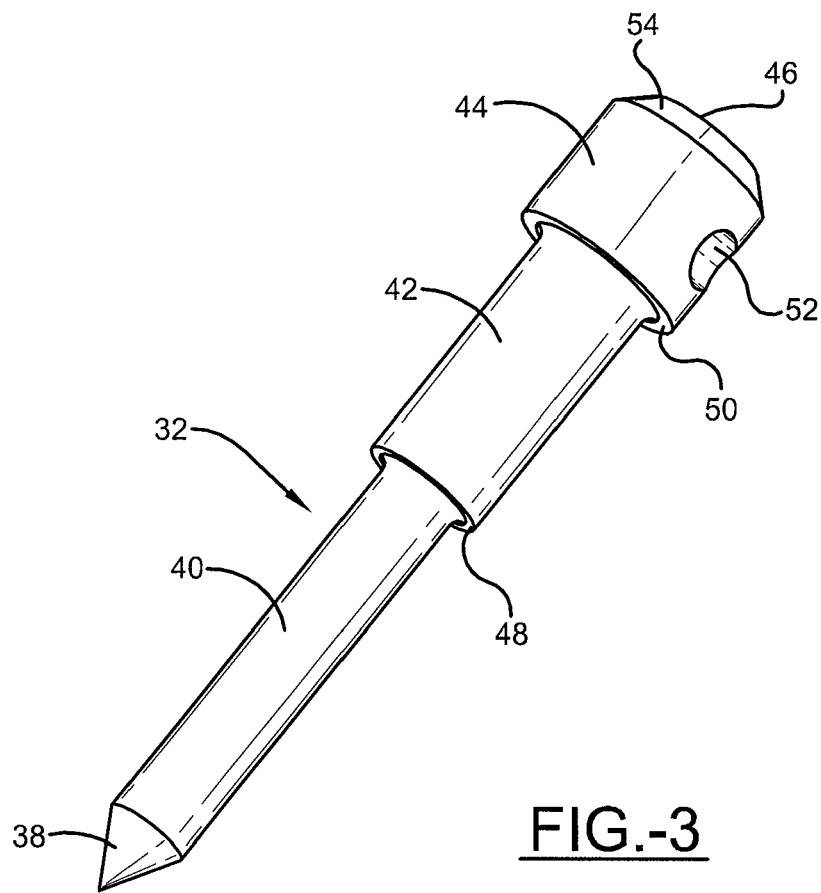
FIG. 3 is a perspective view of the floating punch of the valve punch tool of FIGS. 1 and 2.

Floating punch 32 is shown in FIG. 3 and includes a striking tip 38, a first portion 40, a second portion 42, a third portion 44 and a contact surface 46. Floating punch 32 has a generally cylindrical shape of varying diameters as described below, but different shapes may be chosen. Striking tip 38 may be any shape suitable for breaking the item to be struck, and is generally conically shaped in at least one embodiment. It is the point of impact with the object to be struck (a valve stem assembly). Striking tip 38 is connected to first portion 40, which, in at least one embodiment, has a generally cylindrical shape. First portion 40 is connected to second portion 42, which also has a generally cylindrical shape in at least one embodiment. First portion 40 has a smaller diameter than second portion 42 and an annular first ledge 48 is formed at the intersection of those two portions. Second portion 42 is connected to third portion 44, which also has a generally cylindrical shape in at least one embodiment. Third portion 44 has a larger diameter than second portion 42 and an annular second ledge 50 is formed at the intersection of those two portions. A bore 52 may extend cross-wise through third portion 44. Third portion 44 can be connected to contact surface 46 by a chamfered portion 54. Retaining pin 36 may be chosen to work with bore 52 and, for the embodiment shown, retaining pin 36 may be cylindrical shaped and may be solid or spring type.

Figure 4:
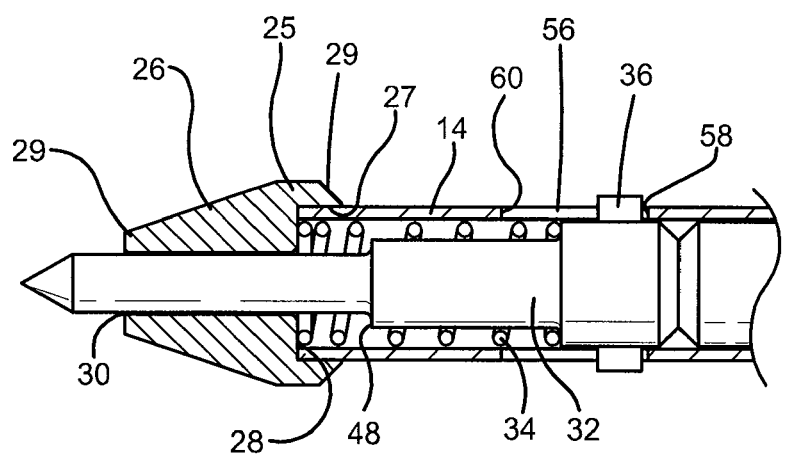
FIG. 4 is a side illustrative view of a portion of the valve punch tool of FIG. 1, showing the housing cap and the floating punch assembly.

Referring to FIGS. 2 and 4, valve punch tool 10 may be assembled as follows. Cap 26 is fixedly connected to housing 14, such as by welding. In an alternative embodiment, cap 26 can be screwed onto housing 14. In another embodiment, the cap 26 may not exist, but rather, the housing may be essentially closed at this end, except for the opening 30. That is, housing 14 may be one integral piece bent to form the closed end of the housing and defining opening 30.

Turning to the embodiment depicted, housing 14 is inserted into mouth 27 of cap 26 so that cap 26 fits over housing 14 and housing 14 comes to rest against lip 28 in cap 26. Spring 34 is placed over striking tip 38 and over first portion 40 and second portion 42, with one end of spring 34 resting on second ledge 50. The combined floating punch 32 and spring 34 are inserted into housing 14 near the end having flange 24. Striking tip 38 and part of first portion 40 of floating punch 32 extend through the opening 30 of cap 26. Housing 14 includes elongated slots 56 proximate cap 26. Floating punch 32 is situated in housing 14 so that bore 52 is visible through the elongated slots 56, and then the retaining pin 36 is inserted through one elongated slot 56, the bore 52, and the other elongated slot 56. While one end of spring 34 is in contact with second ledge 50, the other end is in contact with lip 28 inside cap 26, and the spring extends therebetween. As seen best in FIG. 4, opening 30 has approximately the same diameter as first portion 40, but second portion 42 has a larger diameter than opening 30. This feature provides a stop for the movement of floating punch 32 within housing 14, such that the travel of floating punch 32 within housing 14 is limited. In particular, only first portion 40 is free to move within opening 30, and since second portion 42 has a larger diameter than opening 30, it never enters opening 30. Once the floating punch assembly 16 is so installed, ram bar 12 may be placed inside housing 14 so its striking end 20 is situated proximate the contact surface 46 of floating punch 32.

Since retaining pin 36 protrudes beyond the diameter of housing 14, as best seen in FIG. 4, the relationship between retaining pin 36 and the elongated slots 56 also provide another limit on the position and movement of floating punch 32 within housing 14. In particular, the position and size of elongated slots 56 can be selected to confine the movement of retaining pin 36. Each elongated slot extends from a rearward end 58 to a forward end 60, the distance between the rearward end and the forward end defining the length of each slot. As discussed, the length of each slot can control the position and limit the travel of the floating punch 32.

As shown in FIG. 4, the floating punch assembly 16 is in a resting position. In that position, retaining pin 36 is in contact with rearward ends 58 of the slots 56 because spring 34 is pushing floating punch 32 in the direction of rearward ends 58, and there are no forces acting on floating punch 32 in the direction of forward end 60. The length of elongated slots 56 is chosen so that retaining pin 36 never contacts forward end 60 as the valve punch tool is used. Instead, it is the first ledge 48 coming into contact with lip 28 that stops floating punch 32. Thus, an appropriate configuration can be chosen to prevent spring 34 from being damaged by over compression of the spring, and to prevent retaining pin from being damaged by shearing force at forward end 60 of slots 56.

Figure 7:
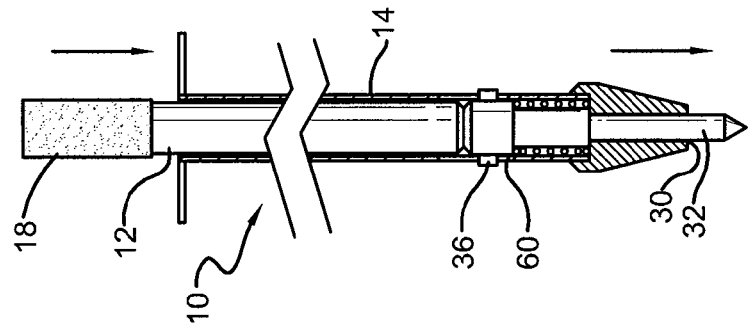
FIG. 7 is a side illustrative view of the valve punch tool of FIG. 5 in a struck position.
Figure 6:
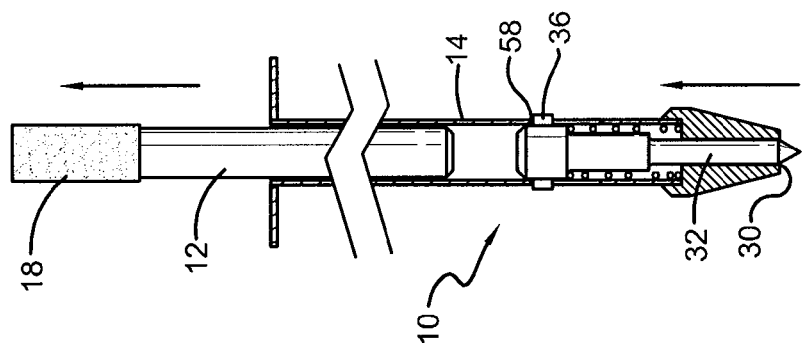
FIG. 6 is a side illustrative view of the valve punch tool of FIG. 5 with the ram bar in a lifted position.
Figure 5:
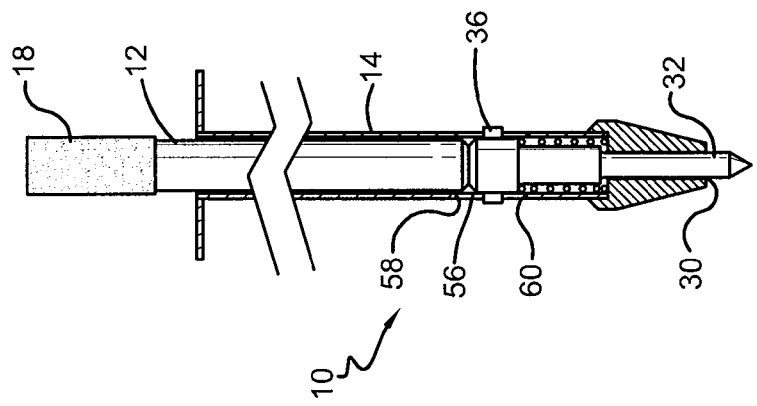
FIG. 5 is a side illustrative view of an assembled valve punch tool constructed according to the concepts of the present invention.

The operation of valve punch tool 10 and the movement of its parts will now be described with reference to FIGS. 5-7. FIG. 5 shows an assembled valve punch tool 10 that includes ram bar 12 situated within housing 14 and in contact with floating punch 32. Because of the weight of ram bar 12 on the floating punch assembly 16, spring 34 is partially compressed and retaining pin 36 is situated between forward end 60 and rearward end 58 of the elongated slots 56. A user will hold valve punch tool 10 by gripping housing 14 (and may use flange 24 for support) and will situate valve punch tool 10 into the desired position against a valve stem assembly. More particularly, the user will position the striking tip 38 into the opening on the back side of the valve stem assembly (not shown) located on the inner surface of the wheel. The user may then lift the ram bar 12 by gripping it at its gripping end 18 and lifting it within the housing 14 away from floating punch assembly 16 to a position such as what is shown FIG. 6. Obviously, the user should not lift the ram bar 12 completely out of the confines of housing 14. Once the weight of ram bar 12 is removed from floating punch assembly 16, spring 34 pushes floating punch 32 so that retaining pin 36 comes into contact with rearward end 58. The user may then rapidly move ram bar 12 back down within housing 14 toward floating punch 32, bringing striking end 20 of ram bar 12 into contact with contact surface 46 of floating punch 32. The biasing force of spring 34 is easily overcome and the floating punch 32 moves in the direction of movement of the ram bar 12, (i.e., extending further from within housing 14 than when in the resting position). As previously discussed, the movement of floating punch 32 is limited because the diameter of second portion 42 is larger than the opening 30 in the cap 26 of housing 14, and the first ledge 48 provides a stop when it contacts lip 28. Thus, in FIG. 7, the greatest possible extent of the floating punch 32 outside housing 14 is shown where first ledge 48 comes into contact with lip 28 of cap 26. Floating punch 32 thus protrudes from housing 14 by an extra length, and the striking force is transferred to the valve stem assembly, causing it to break. Floating punch 32 is only temporarily in the position shown in FIG. 7. Once the valve stem assembly is struck, spring 34 exerts a restoring force on floating punch 32, which is moved back to its resting position, as shown in FIG. 5. Thus, the extra length of first portion 40 that had protruded from housing 14 is drawn back into housing 14, and valve punch tool is ready to be used again. In operation, a user may use valve punch tool 10 to strike a valve stem assembly several times, if necessary, until it breaks and can be removed from the wheel.

Flange 24 provides a degree of protection for a user when operating valve punch tool 10. In particular, a user typically holds housing 14 with one hand, and a flange 24 prevents that hand from getting pinched between the ram bar 12 and the interior of housing 14 as ram bar 12 is moved rapidly within housing 14.

Valve punch tools constructed according to the concepts of the present invention have several advantages over prior art forms. First, they are easy to manufacture. All of the components are easy to manufacture, and assembly of those components is especially easy. The spring 34 is simply inserted onto the floating punch 32, and these two items are inserted into the housing and held into a position with retaining pin 36. Second, valve punch tool 10 is easy to maintain, and if a floating punch 32 becomes damaged or worn out, it is easily replaced. To disassemble valve punch tool 10, one must simply remove retaining pin 36, and floating punch 32 and spring 34 will fall out of housing 14. Spring 34 (either a new spring or the old spring just removed) is then inserted onto a new floating punch 32, and the valve punch tool 10 is reassembled as previously disclosed. Third, because the spring pressure is relatively slight, nearly all of the momentum of a moving ram bar, such as ram bar 12, is transferred to the movement of floating punch 32, thereby providing a more efficient transfer of energy to the valve stem assembly. Fourth, the geometry of cap 26 (particularly, the lengthwise extent of opening 30) provides benefits to the performance of a valve punch tool. By having an opening 30 with an appropriate lengthwise extent, the floating punch 32 can be held in axial alignment with the opening 30, thereby encouraging smooth and aligned movement of the floating punch 32 within the opening 30. Such reduces the binding and related wear that would occur in a cap having a shorter opening, where the floating punch might not be as well aligned. By making its constituent parts more durable and work with greater efficiency, the useful lifetime of the valve punch tool 10 is increased.

Thus, it can be seen that the objects of the invention have been satisfied by the structure and its method for use presented above. While in accordance with the patent statutes, only the best mode and preferred embodiment have been presented and described in detail, it is to be understood that the invention is not limited thereto or thereby. Accordingly, for the appreciation of the true scope and breadth of the invention, reference should be made to the following claims.

What is claimed is:

1. A punch tool comprising:
   a tubular housing having an opening at one end and a cap having a lip that defines said opening;
   a ram bar slidably received within said housing; and
   a floating punch having a first portion, a second portion, and a third portion, a first ledge being formed at the intersection of said first portion and said second portion and a second ledge being formed at the intersection of said second portion and said third portion, and wherein said first portion extends through said opening, and said second portion is situated within said housing and is larger than said opening.

2. The punch tool of claim 1, further comprising a spring extending between said lip and said second ledge.

3. The punch tool of claim 1, wherein said housing includes a second opening, wherein said ram bar is received within said second opening.

4. The punch tool of claim 1, wherein said housing includes slots and said third portion includes a bore, wherein a retaining pin extends through said slots and said bore.

5. A valve punch tool for removing a valve stem assembly from a wheel, the valve punch tool comprising;
   a tubular housing having a cap at one end, said cap defining an opening having a first diameter;

a floating punch having a tip, a first portion, a second portion, and a third portion, a first ledge being formed at the intersection of said first portion and said second portion and a second ledge being formed at the intersection of said second portion and said third portion, and wherein said first portion extends through said opening, and said second portion is situated within said housing and is larger than said opening, wherein said tip contacts the valve stem assembly.

6. The valve punch tool of claim 5, wherein said cap includes a radially-inwardly extending lip defining said opening.

7. The valve punch tool of claim 5, wherein said housing includes at least one slot and said floating punch includes a bore, wherein a retaining pin extends through said slots and said bore.

8. A method of removing a valve stem assembly from a wheel comprising the steps of;

providing a valve punch tool having a tubular housing having a cap at one end, said cap defining an opening having a first diameter; a ram bar slidably received within said housing; and a floating punch having a tip, a first portion, a second portion, and a third portion, a first ledge being formed at the intersection of said first portion and said second portion and a second ledge being formed at the intersection of said second portion and said third portion, and wherein said first portion extends through said opening, and said second portion is situated within said housing and is larger than said opening;

positioning said floating punch on a valve stem assembly; and moving said ram bar and bringing it into contact with said floating punch, wherein said floating punch breaks said valve stem assembly.

9. The method of claim 8, wherein said step of moving said ram bar includes the steps of lifting said ram bar away from said floating punch and moving said ram bar into contact with said floating punch.

* * * * *